US005451354A

United States Patent [19]

Aouad et al.

[11] Patent Number: 5,451,354

[45] Date of Patent: Sep. 19, 1995

[54] CHEMICAL STRUCTURING OF SURFACTANT PASTES TO FORM HIGH ACTIVE SURFACTANT GRANULES

[75] Inventors: Yousef G. Aouad, Brussels; Lucas Goovaerts, Haacht; Jose L. Vega, Strombeek-Bever, all of Belgium

[73] Assignee: The Procter & Gamble Co., Cincinnati, Ohio

[21] Appl. No.: 133,064

[22] PCT Filed: Apr. 9, 1992

[86] PCT No.: PCT/US92/02879

§ 371 Date: Apr. 29, 1994

§ 102(e) Date: Apr. 29, 1994

[87] PCT Pub. No.: WO92/18602

PCT Pub. Date: Oct. 29, 1992

[30] Foreign Application Priority Data

Apr. 12, 1991 [EP] European Pat. Off. ........... 91870060

[51] Int. Cl.[6] ......................... B29B 9/08; C11D 11/00

[52] U.S. Cl. ................................... 264/117; 252/89.1; 252/174.15; 264/28; 264/122; 264/177.11

[58] Field of Search .................. 252/368, 89.1, 174.15; 264/28, 115, 117, 122, 177.11, 171

[56] References Cited

U.S. PATENT DOCUMENTS

| | | | |
|---|---|---|---|
| 3,060,512 | 10/1962 | Martin et al. | 264/211.23 |
| 3,890,419 | 6/1975 | Kaniecki | 264/171 |
| 4,100,244 | 7/1978 | Nonaka | 264/211 |
| 4,515,707 | 5/1985 | Brooks | 252/368 |
| 4,919,847 | 4/1990 | Barletta et al. | 252/558 |
| 4,925,585 | 5/1990 | Strauss et al. | 252/89.1 |
| 4,933,100 | 6/1990 | Ramachandran | 252/95 |
| 5,045,238 | 9/1991 | Jolicoeur et al. | 252/550 |
| 5,263,650 | 11/1993 | Yasui et al. | 241/22 |

FOREIGN PATENT DOCUMENTS

| | | | |
|---|---|---|---|
| 0390251 | 3/1990 | European Pat. Off. . | |
| 0402112 | 6/1990 | European Pat. Off. | C11D 11/04 |
| 0042112 | 12/1990 | European Pat. Off. . | |
| 60-72999 | 4/1985 | Japan . | |
| 61-118500 | 6/1986 | Japan . | |

*Primary Examiner*—Robert A. Dawson
*Assistant Examiner*—Kenneth M. Jones
*Attorney, Agent, or Firm*—Michael D. Jones; Jerry J. Yetter; Jacobus C. Rasser

[57] ABSTRACT

The present invention relates to a process for making a free flowing granular detergent comprising: conditioning of an aqueous surfactant paste having a detergency activity of at least 40%; rapidly forming a uniform stiff paste from said mix at a paste temperature of from 20° to 90° C.; granulating said paste upon mixing with a dry detergent powder.

7 Claims, No Drawings

CHEMICAL STRUCTURING OF SURFACTANT PASTES TO FORM HIGH ACTIVE SURFACTANT GRANULES

FIELD OF THE INVENTION

The present invention relates to a process for preparing compositions comprising condensed detergent granules.

BACKGROUND OF THE INVENTION

Granular detergent compositions have so far been principally prepared by spray drying. In the spray drying process the detergent components, such as surfactants and builders, are mixed with as much as 35–50% water to form a slurry. The slurry obtained is heated and spray dried, which is expensive. A good agglomeration process, however, could be less expensive.

Spray drying requires 30–40 wt. % of the water to be removed. The equipment used to produce spray dry is expensive. The granule obtained has good solubility but a low bulk density, so the packing volume is large. Also, the flow properties of the granule obtained by spray drying are adversely affected by large surface irregularities, and thus the granulate has a poor appearance. There are other known disadvantages in preparing granular detergents by spray drying.

There are many prior art nonspray-drying processes which produce detergent granules. They have drawbacks as well. Most require more than one mixer and a separate granulation operation. Others require use of the acid form of the surfactant to work. Some others require high temperatures which degrade the starting materials. High active surfactant paste is avoided in these processes because of its stickiness.

EP-A-0 110 731, published Aug. 13, 1984, discloses processes for making detergent powders by mixing surfactant solutions in a neat phase, with builder powders in order to form a solid without any evaporative drying. Processes for solid bars or blocks for milling are described, but there is no teaching of paste conditioning to directly form high active granules by agglomeration.

EP-A-0 345 090, published Dec. 6, 1989, discloses a process for manufacturing particulate detergent compositions comprising contacting detergent acid with neutralizing agents and providing particulates by contacting the detergent acid with a particulate neutralizing agent or detergent salt with carrier in an absorption zone.

EP-A-0 349 201, published Jan. 3, 1990, discloses a process for preparing condensed detergent granules by finely dispersing dry detergent builders and a high active surfactant put into a uniform dough which is subsequently chilled and granulated using fine dispersion to form uniform, free flowing granular particles.

EP-0 390 251, published Oct. 3, 1990, discloses a process for the continuous preparation of a granular detergent or composition comprising steps of treating, firstly, particulate starting material of detergent surfactant and builders in a high-spead mixer, secondly in a moderate-speed granulator/densifier and thirdly in a drying/cooling apparatus, with the addition of powder in the second or between the first and second step to reduce the amount of oversize particles.

A. Davidsohn and B. M. Mildwidsky, *Synthetic Detergents,* John Wiley & Sons 6th edition, 1978, discloses general detergency teachings, including the manufacturing of finished detergent products.

High shear and cold mixing processes per se are known, but they require an extra grinding step or some other action. E.g., some use a dry neutralization technique of mixing an acid form of the surfactant with sodium carbonate. See U.S. Pat. No. 4,515,707, Brooks, issued May 7, 1985; Japanese laid-open Appln. No. 183540/1983, Kao Soap Co., Ltd., filed Sep. 30, 1983; and Japanese Sho. 61-118500, Lion K.K., Jun. 5, 1986. Typically, excess carbonate is required (2–20 molar excess) to assure reasonable conversion of the surfactant acids. Excess carbonate adversely drives up the wash water pH to the very alkaline range which can be undesirable, particularly for some low-phosphate formulas.

The use of a surfactant acid generally requires immediate use or cool temperature storage, for highly reactive acids such as the alkyl sulfate acids are subject to degradation unless cooled, they tend to undergo hydrolysis during storage, forming free sulfuric acid and alcohol. In practical terms, such prior art processes require close-coupling of surfactant acid production with granulation which requires an additional capital investment.

A second route, well known in the field and described in the patent literature, is the in-situ neutralisation of the anionic surfactant acid with caustic solutions (e.g. 50% NaOH) or caustic powders (e.g. $Na_2CO_3$) right before or in the course of the granulation step. In this situation, precautions are needed to ensure complete neutralisation of the acid to avoid undesirable effects on the rest of the surfactant matrix upon storage/or during the wash. The resulting particle is a highly dense granule which can be incorporated into granular detergents.

while this second route uses lower temperatures and less drastic shear conditions than crutching and spray drying, it has many limitations. On one side the need to carry out a chemical reaction (neutralization) during or right before the granulation step limits considerably the range of processing conditions that can be used (temperature, chemicals, etc.). The very low pH of the anionic surfactant acid prevents the incorporation of chemicals sensitive to these acidic conditions. But above all, in the case of those anionic surfactants which are not chemically stable in the acid form or physically unstable, this process requires the close coupling of the sulphation/-sulphonation unit with the neutralization/granulation step. This results in considerable limitations in the logistics and/or the design of the facilities for these processes as well as an important increase in the complexity and difficulty of the control systems for the overall process.

The present invention brings solutions to the problems mentioned above and provides with a more flexible and versatile route to the processing of granular detergents. The present invention is based on an agglomeration/granulation step that is completely uncoupled from the sulphation/sulphonation process. To obtain the greatly increased surfactant activity of the agglomerates, the present invention enables the increase in the ratio of paste to powder that can be formed into crisp granules. This is achieved by a chemical and/or physical structuring of the paste, such as the addition of specific chemical structuring agents and/or moisture removal, temperature control. The basis of the invention is the introduction of the anionic surfactant in an aqueous, highly concentrated solution of its salt, most preferably of its sodium salt. These high active (low moisture) surfactant pastes are of a high viscosity but remain pumpable at temperatures at which the surfactants are stable. This guarantees the ability to transport and transfer the chemical from the manufacturing location to the granulation site and to be able to have adequate storage facilities prior to the formation of a particle. For those cases where both the sulphation/sulphonation is already immediately preceding the granulation step, it provides the possibility to install intermediate buffer tanks that simplifies the control of the whole unit. In the case of some anionic surfactants or mixtures of them where highly viscous liquid crystal phases occur, this technology requires that either lower viscous phases can be formed (e.g. neat phases) or that some viscosity modifiers are used (e.g. hydrotropes).

The present invention also describes a process for carrying out the conditioning of the paste. It has been discovered that the addition of the chemical structuring agents, the control of temperature and/or the removal of water from the paste is critical to physical properties such as viscosity, melting point and stickiness which in turn determine the characteristics of the detergent granules made by mixing/granulation of the paste. It has been found that a very effective way to achieve this paste conditioning is to use an extruder.

An important object of the present invention is to make a dense, concentrated detergent granular product by an agglomeration process as opposed to a spray-drying process. Other objects of the present invention will be apparent in view of the following.

SUMMARY OF THE INVENTION

The present invention relates to an economical process for making a dense, concentrated detergent granular product, and particularly, compositions comprising very high active condensed detergent granules, wherein said process comprises high active paste agglomeration steps coupled with chemical treatment of the resultant paste.

The present invention is particularly applicable to all neutralized AS aqueous pastes. It may prove applicable to a wide variety of surfactants.

DETAILED DESCRIPTION OF THE INVENTION

The present invention relates to a process for making, a free flowing granular detergent comprising: mixing an effective amount of a chemical structuring agent and an effective amount of an aqueous surfactant paste having a detergency activity of at least 40%; rapidly forming a uniform stiff paste from said mix at a paste temperature of from 20° to 90° C.; granulating said paste upon mixing with a dry detergent powder wherein said surfactant paste is comprised of at least one anionic surfactant, and any other surfactants, if present, are selected from the group of anionic, nonionic, zwitterionic, ampholytic and cationic surfactants and mixtures thereof. In a preferred process said chemical structuring agent is added in a continuous process.

The present invention is based on a process for producing high active surfactant pastes, having an agglomeration/granulation step that is completely uncoupled from the sulphation/sulphonation process, and, additionally, a chemical conditioning of the pastes produced by said process to obtain high active granules. Conditioning of a paste means the modifying its physical characteristics to form higher active agglomerates which otherwise are not easily obtainable under normal operating conditions. The present invention is particularly applicable to all neutralized AS aqueous pastes. It may prove applicable to a wide variety of surfactants (e.g. Coco, Tallow, . . . etc). In one embodiment of the present invention, the introduction of the anionic surfactant in an aqueous, highly concentrated solution of its salt, preferably its sodium salt. These high active (and, preferably, low moisture) surfactant pastes are of a high viscosity but remain pumpable at temperatures at which the surfactants are stable. In other embodiments of the present invention, anionic surfactants or mixtures comprising at least one anionic surfactant, where highly viscous liquid crystal phases occur, requires that either lower viscous phases be formed or that some viscosity modifiers are used. On a more preferred embodiment organic and/or inorganic compounds that alters the physical structure and/or physical characteristics of the surfactant paste are added to the paste. It has been found that the addition to the surfactant paste reduces the stickiness of the paste, increases its viscosity and increases its softening point. This allows for more paste to be added during the agglomeration process thus leading to higher active agglomerates i.e. more than 50%. This method of treating the surfactant paste can be performed batchwise and continuous, preferably continuously.

In a preferred embodiment of the invention an extruder is used to condition the paste. The extruder is a versatile piece of equipment which enables two or more pastes to be mixed and/or the chemical structuring agents to be added to, and mixed with the viscous paste. Furthermore it enables moisture to be removed under vacuum, and it enables control of paste temperature.

Conditioning of the paste, as defined herein, means: a) increasing its apparent viscosity, b) increasing its effective melting point, c) increasing the "hardness" of the paste and d) decreasing the stickiness of the granules formed. The hardness/softness of the paste may be measured by a softness penetrometer according to ASTM D 217-IP50 or ISO 2137. Paste hardness measured in this way should be less than 2 cm, preferably less than 1 cm.

This paste conditioning may be achieved by i) cooling, ii)drying, iii) adding of structurants (usually electolytes) to the high active detergent paste. A paste useful for this invention will consist of at least 40% by weight of salts of anionic surfactants, which has a viscosity of at least 10 Pa.s when measured at 70° C. and a shear rate of 25 $s^{-1}$.

The Chemical Structuring Agents

Various chemical structuring agents, when added to the surfactant paste, result in a modification of the chemical and/or physical characteristics of the paste to form very high active agglomerates. These agents may be in a solid, liquid or solution form, depending on their specific chemical properties. Examples of agents useful in the present invention include 50% NaOH (aq), 50% KOH (aq), NaCl, phosphonate, silicate, silica, starch, polymers and copolymers, nonionic surfactant and urea. The agents above can be used independently or in combination with each other, in accordance with their comparability.

The Pastes

One or various aqueous pastes of the salts of anionic surfactants is preferred for use in the present invention, preferably the sodium salt of the anionic surfactant. In a preferred embodiment, the anionic surfactant is preferably as concentrated as possible, (that is, with the lowest possible moisture content that allows it to flow in the manner of a liquid) so that it can be pumped at temperatures at which it remains stable. While granulation using various pure or mixed surfactants is known, for the present invention to be of practical use in industry and to result in particles of adequate physical properties to be incorporated into granular detergents, an anionic surfactant must be part of the paste in a concentration of above 10%, preferably from 10–95%, more preferably from 20–95%, and most preferably from 40%–95%.

It is preferred that the moisture in the surfactant aqueous paste is as low as possible, while maintaining paste fluidity, since low moisture leads to a higher concentration of the surfactant in the finished particle. Preferably the paste contains between 5 and 40% water, more preferably between 5 and 30% water and most preferably between 5% and 20% water. A highly attractive mode of operation for lowering the moisture of the paste prior to entering the agglomerator without problems with very high viscosities is the installation, in line, of an atmospheric or a vacuum flash drier whose outlet is connected to the agglomerator.

It is preferable to use high active surfactant pastes to minimize the total water level in the system during mixing, granulating and drying. Lower water levels allow for: (1) a higher active surfactant to builder ratio, e.g., 1:1; (2) higher levels of other liquids in the formula without causing dough or granular stickiness; (3) less cooling, due to higher allowable granulation temperatures; and (4) less granular drying to meet final moisture limits.

Two important parameters of the surfactant pastes which can affect the mixing and granulation step are the paste temperature and viscosity. Viscosity is a function, among others, of concentration and temperature, with a range in this application from about 10,000 cps to 10,000,000 cps. Preferably, the viscosity of the paste entering the system is from about 20,000 to about 100,000 cps. and more preferably from about 30,000 to about 70,000 cps. The viscosity of the paste of this invention is measured at a temperature of 70° C.

The paste can be introduced into the mixer at an initial temperature between its softening point (generally in the range of 40°–60° C.) and its degradation point (depending on the chemical nature of the paste, e.g. alkyl sulphate pastes tend to degrade above 75°–85° C.). High temperatures reduce viscosity simplifying the pumping of the paste but result in lower active agglomerates. The use of in-line moisture reduction steps (e.g. flash drying), however, require the use of higher temperatures (above 100° C.). In the present invention, the activity of the agglomerates is maintained high due to the elimination of moisture.

The introduction of the paste into the mixer can be done in many ways, from simply pouring to high pressure pumping through small holes at the end of the pipe, before the entrance to the mixer. While all these ways are viable to manufacture agglomerates with good physical properties, it has been found that in a preferred embodiment of the present invention the extrusion of the paste results in a better distribution in the mixer which improves the yield of particles with the desired size. The use of high pumping pressures prior to the entrance in the mixer results in an increased activity in the final agglomerates. By combining both effects, and introducing the paste through holes (extrusion) small enough to allow the desired flow rate but that keep the pumping pressure to a maximum feasible in the system, highly advantageous results are achieved.

High Active surfactant Paste

The activity of the aqueous surfactant paste is at least 30% and can go up to about 95%; preferred activities are: 50–80% and 65–75%. The balance of the paste is primarily water but can include a processing aid such as a nonionic surfactant. At the higher active concentrations, little or no builder is required for cold granulation of the paste. The resultant concentrated surfactant granules can be added to dry builders or powders or used in conventional agglomeration operations. The aqueous surfactant paste contains an organic surfactant selected from the group consisting of anionic, zwitterionic, ampholytic and cationic surfactants, and mixtures thereof. Anionic surfactants are preferred. Nonionic surfactants are used as secondary surfactants or processing aids and are not included herein as an "active" surfactant. Surfactants useful herein are listed in U.S. Pat. No. 3,664,961, Norris, issued May 23, 1972, and in U.S. Pat. No. 3,919,678, Laughlin et al., issued Dec. 30, 1975. Useful cationic surfactants also include those described in U.S. Pat. No. 4,222,905, Cockrell, issued Sep. 16, 1980, and in U.S. Pat. No. 4,239,659, Murphy, issued Dec. 16, 1980. However, cationic surfactants are generally less compatible with the aluminosilicate materials herein, and thus are preferably used at low levels, if at all, in the present compositions. The following are representative examples of surfactants useful in the present compositions.

Water-soluble salts of the higher fatty acids, i.e., "soaps", are useful anionic surfactants in the compositions herein. This includes alkali metal soaps such as the sodium, potassium, ammonium, and alkylammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Useful anionic surfactants also include the water-soluble salts, preferably the alkali metal, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are the sodium and potassium alkyl sulfates, especially those obtained by sulfating the higher alcohols ($C_8$–$C_{18}$ carbon atoms) such as those produced by reducing the glycerides of tallow or coconut oil; and the sodium and potassium alkyl benzene sulfonates in which the alkyl group contains from about 9 to about 15 carbon atoms, in straight or branched chain configuration, e.g., those of the type described in U.S. Pat. Nos. 2,220,099 and 2,477,383. Especially valuable are linear straight chain alkyl benzene sulfonates in which the average number of carbon atoms in the alkyl group is from about 11 to 13, abbreviated as $C_{11}$–$C_{13}$ LAS.

Other anionic surfactants herein are the sodium alkyl glyceryl ether sulfonates, especially those ethers of higher alcohols derived from tallow and coconut oil; sodium coconut oil fatty acid monoglyceride sulfonates and sulfates; sodium or potassium salts of alkyl phenol ethylene oxide ether sulfates containing from about 1 to about 10 units of ethylene oxide per molecule and wherein the alkyl groups contain from about 8 to about 12 carbon atoms; and sodium or potassium salts of alkyl ethylene oxide ether sulfates containing from about 1 to about 10 units of ethylene oxide per molecule and wherein the alkyl group contains from about 10 to about 20 carbon atoms.

Other useful anionic surfactants herein include the water-soluble salts of esters of alpha-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; watersoluble salts of olefin sulfonates containing from about 12 to 24 carbon atoms; and beta-alkyloxy alkane sulfonates containing from about 1 to 3 carbon atoms in the alkyl group and from about 8 to about 20 carbon atoms in the alkane moiety. Although the acid salts are typically discussed and used, the acid neutralization cam be performed as part of the fine dispersion mixing step.

The preferred anionic surfactant pastes are mixtures of linear or branched alkylbenzene sulfonates having an alkyl of 10–16 carbon atoms and alkyl sulfates having an alkyl of 10–18 carbon atoms. These pastes are usually produced by reacting a liquid organic material with sulfur trioxide to produce a sulfonic or sulfuric acid and then neutralizing the acid to produce a salt of that acid. The salt is the surfactant paste discussed throughout this document. The sodium salt is preferred due to end performance benefits and cost of NaOH vs. other neutralizing agents, but is not required as other agents such as KOH may be used.

Water-soluble nonionic surfactants are also useful as secondary surfactant in the compositions of the invention. Indeed, preferred processes use anionic/nonionic blends. A particularly preferred paste comprises a blend of nonionic and anionic surfactants having a ratio of from about 0.01:1 to about 1:1, more preferably about 0.05:1. Nonionics can be used up to an equal amount of the primary organic surfactant. Such nonionic materials include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a watersoluble compound having the desired degree of balance between hydrophilic and hydrophobic elements.

Suitable nonionic surfactants include the polyethylene oxide condensates of alkyl phenols, e.g., the condensation products of alkyl phenols having an alkyl group containing from about 6 to 16 carbon atoms, in either a straight chain or branched chain configuration, with from about 4 to 25 moles of ethylene oxide per mole of alkyl phenol.

Preferred nonionics are the water-soluble condensation products of aliphatic alcohols containing from 8 to 22 carbon atoms, in either straight chain or branched configuration, with from 4 to 25 moles of ethylene oxide per more of alcohol. Particularly preferred are the condensation products of alcohols having an alkyl group containing from about 9 to 15 carbon atoms with from about 4 to 25 moles of ethylene oxide per mole of alcohol; and condensation products of propylene glycol with ethylene oxide.

Semi-polar nonionic surfactants include water-soluble amine oxides containing one alkyl moiety of from about 10 to 18 carbon atoms and 2 moieties selected from the group consisting of alkyl groups and hydroxyalkyl groups containing from 1 to about 3 carbon atoms; water-soluble phosphine oxides containing one alkyl moiety of about 10 to 18 carbon atoms and 2 moieties selected from the group consisting of alkyl groups and hydroxyalkyl groups containing from about 1 to 3 carbon atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Ampholytic surfactants include derivatives of aliphatic or aliphatic derivatives of heterocyclic secondary and tertiary amines in which the aliphatic moiety can be either straight or branched chain and wherein one of the aliphatic substituents contains from about 8 to 18 carbon atoms and at least one aliphatic substituent contains an anionic water-solubilizing group.

Zwitterionic surfactants include derivatives of aliphatic quaternary ammonium phosphonium, and sulfonium compounds in which one of the aliphatic substituents contains from about 8 to 18 carbon atoms.

Particularly preferred surfactants herein include linear alkylbenzene sulfonates containing from about 11 to 14 carbon atoms in the alkyl group; tallow alkyl sulfates; coconutalkyl glyceryl ether sulfonates; alkyl ether sulfates wherein the alkyl moiety contains from about 14 to 18 carbon atoms and wherein the average degree of ethoxylation is from about 1 to 4; olefin or paraffin sulfonates containing from about 14 to 16 carbon atoms; alkyldimethylamine oxides wherein the alkyl group contains from about 11 to 16 carbon atoms; alkyldimethylammonio propane sulfonates and alkyldimethylammonio hydroxy propane sulfonates wherein the alkyl group contains from about 14 to 18 carbon atoms; soaps of higher fatty acids containing from about 12 to 18 carbon atoms; condensation products of C9–C15 alcohols with from about 3 to 8 moles of ethylene oxide, and mixtures thereof.

Useful cationic surfactants include. Useful cationic surfactants include water-soluble quaternary ammonium compounds of the form $R_4R_5R_6R_7N^+X^-$, wherein $R_4$ is alkyl having from 10 to 20, preferably from 12–18 carbon atoms, and $R_5$, $R_6$ and $R_7$ are each $C_1$ to $C_7$ alkyl preferably methyl; $X^-$ is an anion, e.g. chloride. Examples of such trimethyl ammonium compounds include $C_{12-14}$ alkyl trimethyl ammonium chloride and cocalkyl trimethyl ammonium methosulfate.

Specific preferred surfactants for use herein include: sodium linear $C_{11}$–$C_{13}$ alkylbenzene sulfonate; α-olefin sulphonates; triethanolammonium $C_{11}$–$C_{13}$ alkylbenzene sulfonate; alkyl sulfates, (tallow, coconut, palm, synthetic origins, e.g. $C_{45}$, etc.); sodium alkyl sulfates; MES; sodium coconut alkyl glyceryl ether sulfonate; the sodium salt of a sulfated condensation product of a tallow alcohol with about 4 moles of ethylene oxide; the condensation product of a coconut fatty alcohol with about 6 moles of ethylene oxide; the condensation product of tallow fatty alcohol with about 11 moles of ethylene oxide; the condensation of a fatty alcohol containing from about 14 to about 15 carbon atoms with about 7 moles of ethylene oxide; the condensation product of a $C_{12}$–$C_{13}$ fatty alcohol with about 3 moles of ethylene oxide; 3-(N,N-dimethyl-N-coconutalkylammonio)-2-hydroxypropane-1-sulfonate; 3-(N,N-dimethyl-N-coconutalkylammonio)-propane-1-sulfonate; 6-(N-dodecylbenzyl-N,N-dimethylammonio) hexanoate; dodecyldimethylamine oxide; coconutalkyldimethylamine oxide; and the water-soluble sodium and potassium salts of coconut and tallow fatty acids.

(As used herein, the term "surfactant" means nonnonionic surfactants, unless otherwise specified. The ratio of the surfactant active (excluding the nonionic(s)) to dry detergent builder or powder ranges from 0.005 to 19:1, preferably from 0.05 to 10:1, and more preferably from 0.1:1 to 5:1. Even more preferred said surfactant active to builder ratios are 0.15:1 to 1:1; and 0.2:1 to 0.5:1).

The Extruder

The extruder fulfils the functions of pumping and mixing the viscous surfactant paste on a continuous basis. A basic extruder consists of a barrel with a smooth inner cylindrical surface. Mounted within this barrel is the extruder screw. There is an inlet port for the high active paste which, when the screw is rotated, causes the paste to be moved along the length of the barrel.

The detailed design of the extruder allows various functions to be carried out. Firstly additional ports in the barrel may allow other ingredients, including the chemical structuring agents to be added directly into the barrel. Secondly a vacuum pump and a seal around the shaft of the screw allows a vacuum to be drawn which enables the moisture level to be reduced. Thirdly means for heating or cooling may be installed in the wall of the barrel for temperature control. Fourthly, careful design of the extruder screw promotes mixing of the paste both with itself and with other additives.

A preferred extruder is the twin screw extruder. This type of extruder has two screws mounted in parallel within the same barrel, which are made to rotate either in the same direction (co-rotation) or in opposite directions (counter-rotation). The co-rotating twin screw extruder is the most preferred piece of equipment for use in this invention.

An extruder is particularly useful in this invention because the paste can be effectively cooled by adding liquid nitrogen or solid carbon dioxide into the barrel (this may be considered surprising, because normally an extruder heats its contents as a result of the mechanical energy input to overcome viscous shear forces) and at the same time pumps the increasingly viscous (colder) paste out of the extruder and into the mixer/agglomerator were granulation takes place.

Suitable twin screw extruders for use in the present invention include those supplied by: APV Baker, (CP series); Werner and Pfleiderer, (Continua Series); Wenger, (TF Series); Leistritz, (ZSE Series); and Buss, (LR Series).

The extruder allows the paste to be conditioned by moisture and temperature reduction. Moisture may be removed under vacuum, preferably between 0 mmHg (gauge) and −55 mmHg (gauge), (0–7.3 kPa below atmospheric pressure).

Temperature may be reduced by the addition of solid carbon dioxide or liquid nitrogen directly into the extruder barrel. Preferably liquid nitrogen is used at up to 30% by weight of the paste.

Powder stream

Although the preferred embodiment of the process of the present invention involves introduction of the anionic surfactant in via pastes as described above, it is possible to have a certain amount via the powder stream, for example in the form of blown powder. In these embodiments, it is necessary that the stickiness and moisture of the powder stream be kept at low levels, thus preventing increased "loading" of the anionic surfactant and, thus, the production of agglomerates with too high of a concentration of surfactant. The liquid stream of a preferred agglomeration process can also be used to introduce other surfactants and/or polymers. This can be done by premixing the surfactant into one liquid stream or, alternatively by introducing various streams in the agglomerator. These two process embodiments may produce differences in the properties of the finished particles (dispensing, gelling, rate of dissolution, etc.), particularly, if mixed surfactants are allowed to form prior to particle formation. These differences can then be exploited to the advantage of the intended application for each preferred process.

It has also been observed that by using the presently described technology, it has been possible to incorporate higher levels of certain chemicals (e.g. nonionic, citric acid) in the final formula than via any other known processing route without detrimental effects to some key properties of the matrix (caking, compression, etc.).

The Fine Dispersion Mixing and Granulation

The term "fine dispersion mixing and/or granulation," as used herein, means mixing and/or granulation of the above mixture in a fine dispersion mixer at a blade tip speed of from about 5 m/sec. to about 50 m/sec., unless otherwise specified. The total residence time of the mixing and granulation process is preferably in the order of from 0.1 to 10 minutes, more preferably 0.1–5 and most preferably 0.2–4 minutes. The more preferred mixing and granulation tip speeds are about 10–45 m/sec. and about 15–40 m/sec.

The ratio of paste to powder should be chosen in order to maintain visible, discrete particles at all stages of the process. These particles may be sticky at higher temperatures but must be substantially free flowing so that the mixing and granulation steps can be carried out simultaneously, or immediately sequentially without causing blockage of the mixer/granulator.

Any apparatus, plants or units suitable for the processing of surfactants can be used for carrying out the process according to the invention. Suitable apparatus includes, for example, falling film sulphonating reactors, digestion tanks, esterification reactors, etc. For mixing/agglomeration any of a number of mixers/agglomerators can be used. In one preferred embodiment, the process of the invention is continuously carried out. Especially preferred are mixers of the Fukae® FS-G series manufactured by Fukae Powtech Kogyo Co., Japan; this apparatus is essentially in the form of a bowl-shaped vessel accessible via a top port, provided near its base with a stirrer having a substantially vertical axis, and a cutter positioned on a side wall. The stirrer and cutter may be operated independently of one another and at separately variable speeds. The vessel can be fitted with a cooling jacket or, if necessary, a cryogenic unit.

Other similar mixers found to be suitable for use in the process of the invention include Diosna ® V series ex Dierks & söhne, Germany; and the Pharma Matrix ® ex T K Fielder Ltd., England. Other mixers believed to be suitable for use in the process of the invention are the Fuji ® VG-C series ex Fuji Sangyo Co., Japan; and the Roto ® ex Zanchetta & Co srl, Italy.

Other preferred suitable equipment can include Eirich ®, series RV, manufactured by Gustau Eirich Hardheim, Germany; Lödige ®, series FM for batch mixing, series Baud KM for continuous mixing/agglomeration, manufactured by Lödige Machinenbau GmbH, Paderborn Germany; Drais ® T160 series, manufactured by Drais Werke GmbH, Mannheim Germany; and Winkworth ® RT 25 series, manufactured by Winkworth Machinery Ltd., Bershire, England.

The Littleford Mixer, Model #FM-130-D-12, with internal chopping blades and the Cuisinart Food Processor, Model #DCX-Plus, with 7.75 inch (19.7 cm) blades are two examples of suitable mixers. Any other mixer with fine dispersion mixing and granulation capability and having a residence time in the order of 0.1 to 10 minutes can be used. The "turbine-type" impeller mixer, having several blades on an axis of rotation, is preferred. The invention can be practiced as a batch or a continuous process.

Operating Temperatures

Preferred operating temperatures should also be as low as possible since this leads to a higher surfactant concentration in the finished particle. Preferably the temperature during the agglomeration is less than 100° C., more preferably between 10° and 90° C., and most preferably between 20° and 80° C. Lower operating temperatures useful in the process of the present invention may be achieved by a variety of methods known in the art such as nitrogen cooling, cool water jacketing of the equipment, addition of solid $CO_2$, and the like; with a preferred method being solid $CO_2$, and the most preferred method being nitrogen cooling.

A highly attractive option in a preferred embodiment of the present invention to further increase the concentration of surfactant in the final particle, is accomplished by the addition to a liquid stream containing the anionic surfactant and/or other surfactant, of other elements that result in increases in viscosity and/or melting point and/or decrease the stickiness of the paste. In a preferred embodiment of the process of the present invention the addition of these elements can be done in line as the paste is pumped into the agglomerator. Example of these elements can be various powders, described in more detail herein.

Final Agglomerate Composition

The present invention produces granules of high density for use in detergent compositions. A preferred composition of the final agglomerate for incorporation into granular detergents has a high surfactant concentration. By increasing the concentration of surfactant, the particles/agglomerates made by the present invention are more suitable for a variety of different formulations. These high surfactants containing particle agglomerates require fewer finishing techniques to reach the final agglomerates, thus freeing up large amounts of processing aids (inorganic powders, etc.) that can be used in other processing steps of the overall detergent manufacturing process (spray drying, dusting off, etc).

The granules made according to the present invention are large, low dust and free flowing, and preferably have a bulk density of from about 0.4 to about 1.2 g/cc, more preferably from about 0.6 to about 0.8 g/cc. The weight average particle size of the particles of this invention are from about 200 to about 1000 microns. The preferred granules so formed have a particle size range of from 200 to 2000 microns. The more preferred granulation temperatures range from about 10° C. to about 60° C., and most preferably from about 20° C. to about 50° C.

Drying

The desired moisture content of the free flowing granules of this invention can be adjusted to levels adequate for the intended application by drying in conventional powder drying equipment such as fluid bed dryers. If a hot air fluid bed dryer is used, care must be exercised to avoid degradation of heat sensitive components of the granules. It is also advantageous to have a cooling step prior to large scale storage. This step can also be done in a conventional fluid bed operated with cool air. The drying/cooling of the agglomerates can also be done in any other equipment suitable for powder drying such as rotary dryers, etc.

For detergent applications, the final moisture of the agglomerates needs to be maintained below levels at which the agglomerates can be stored and transported in bulk. The exact moisture level depends on the composition of the agglomerate but is typically achieved at levels of 1–8% free water (i.e. water not associated to any crystalline species in the agglomerate) and most typically at 2–4%.

Detergency Builders and Powders

Any compatible detergency builder or combination of builders or powder can be used in the process and compositions of the present invention.

The detergent compositions herein can contain crystalline aluminosilicate ion exchange material of the formula $$Na_z[(AlO_2)_z\cdot(SiO_2)_y]\cdot xH_2O$$

wherein z and y are at least about 6, the molar ratio of z to y is from about 1.0 to about 0.4 and z is from about 10 to about 264. Amorphous hydrated aluminosilicate materials useful herein have the empirical formula $$M_z(zAlO_2\cdot ySiO_2)$$

wherein M is sodium, potassium, ammonium or substituted ammonium, z is from about 0.5 to about 2 and y is 1, said material having a magnesium ion exchange capacity of at least about 50 milligram equivalents of $CaCO_3$ hardness per gram of anhydrous aluminosilicate. Hydrated sodium Zeolite A with a particle size of from about 1 to 10 microns is preferred.

The aluminosilicate ion exchange builder materials herein are in hydrated form and contain from about 10% to about 28% of water by weight if crystalline, and potentially even higher amounts of water if amorphous. Highly preferred crystalline aluminosilicate ion exchange materials contain from about 18% to about 22% water in their crystal matrix. The crystalline aluminosilicate ion exchange materials are further characterized by a particle size diameter of from about 0.1 micron to about 10 microns. Amorphous materials are often smaller, e.g., down to less than about 0.01 micron. Preferred ion exchange materials have a particle size diameter of from about 0.2 micron to about 4 microns. The term "particle size diameter" herein represents the average particle size diameter by weight of a given ion exchange material as determined by conventional analytical techniques such as, for example, microscopic determination utilizing a scanning electron microscope. The crystalline aluminosilicate ion exchange materials herein are usually further characterized by their calcium ion exchange capacity, which is at least about 200 mg equivalent of $CaCO_3$ water hardness/g of aluminosilicate, calculated on an anhydrous basis, and which generally is in the range of from about 300 mg eq./g to about 352 mg eq./g. The aluminosilicate ion exchange materials herein are still further characterized by their calcium ion exchange rate which is at least about 2 grains $Ca^{++}$/gallon/minute/gram/gallon of aluminosilicate (anhydrous basis), and generally lies within the range of from about 2 grains/gallon/minute/gram/gallon to about 6 grains/gallon/minute/gram/gallon, based on calcium ion hardness. Optimum aluminosilicate for builder purposes exhibit a calcium ion exchange rate of at least about 4 grains/gallon/minute/gram/gallon.

The amorphous aluminosilicate ion exchange materials usually have a $Mg^{++}$ exchange of at least about 50 mg eq. $CaCO_3$/g (12 mg $Mg^{++}$/g) and a $Mg^{++}$ exchange rate of at least about 1 grain/gallon/minute/-gram/gallon. Amorphous materials do not exhibit an observable diffraction pattern when examined by Cu radiation (1.54 Angstrom Units).

Aluminosilicate ion exchange materials useful in the practice of this invention are commercially available. The aluminosilicates useful in this invention can be crystalline or amorphous in structure and can be naturally occurring aluminosilicates or synthetically derived. A method for producing aluminosilicate ion exchange materials is discussed in U.S. Pat. No. 3,985,669, Krummel et al., issued Oct. 12, 1976, incorporated herein by reference. Preferred synthetic crystalline aluminosilicate ion exchange materials useful herein are available under the designations Zeolite A, Zeolite B, and Zeolite X. In an especially preferred embodiment, the crystalline aluminosilicate ion exchange material has the formula $$Na_{12}[(AlO_2)_{12}(SiO2)_{12}]\cdot xH_2O$$

wherein x is from about 20 to about 30, especially about 27 and has a particle size generally less than about 5 microns.

The granular detergents of the present invention can contain neutral or alkaline salts which have a pH in solution of seven or greater, and can be either organic or. inorganic in nature. The builder salt assists in providing the desired density and bulk to the detergent granules herein. While some of the salts are inert, many of them also function as detergency builder materials in the laundering solution.

Examples of neutral water-soluble salts include the alkali metal, ammonium or substituted ammonium chlorides, fluorides and sulfates. The alkali metal, and especially sodium, salts of the above are preferred. Sodium sulfate is typically used in detergent granules and is a particularly preferred salt. Citric acid and, in general, any other organic or inorganic acid may be incorporated into the granular detergents of the present invention as long as it is chemically compatible with the rest of the agglomerate composition.

Other useful water-soluble salts include the compounds commonly known as detergent builder materials. Builders are generally selected from the various water-soluble, alkali metal, ammonium or substituted ammonium phosphates, polyphosphates, phosphonates, polyphosphonates, carbonates, silicates, borates, and polyhyroxysulfonates. Preferred are the alkali metal, especially sodium, salts of the above.

Specific examples of inorganic phosphate builders are sodium and potassium tripolyphosphate, pyrophosphate, polymeric metaphosphate having a degree of polymerization of from about 6 to 21, and orthophosphate. Examples of polyphosphonate builders are the sodium and potassium salts of ethylene diphosphonic acid, the sodium and potassium salts of ethane 1-hydroxy-1,1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148, incorporated herein by reference.

Examples of nonphosphorus, inorganic builders are sodium and potassium carbonate, bicarbonate, sesquicarbonate, tetraborate decahydrate, and silicate having a molar ratio of $SiO_2$ to alkali metal oxide of from about 0.5 to about 4.0, preferably from about 1.0 to about 2.4. The compositions made by the process of the present invention does not require excess carbonate for processing, and preferably does not contain over 2% finely divided calcium carbonate as disclosed in U.S. Pat. No. 4,196,093, Clarke et al., issued Apr. 1, 1980, and is preferably free of the latter.

As mentioned above powders normally used in detergents such as zeolite, carbonate, silica, silicate, citrate, phosphate, perborate, etc. and process acids such as starch, can be used in preferred embodiments of the present invention.

Polymers

Also useful are various organic polymers, some of which also may function as builders to improve detergency. Included among such polymers may be mentioned sodium carboxy-lower alkyl celluloses, sodium lower alkyl celluloses and. sodium hydroxy-lower alkyl celluloses, such as sodium carboxymethyl cellulose, sodium methyl cellulose and sodium hydroxypropyl cellulose, polyvinyl alcohols (which often also include some polyvinyl acetate), polyacrylamides, polyacrylates and various copolymers, such as those of maleic and acrylic acids. Molecular weights for such polymers vary widely but most are within the range of 2,000 to 100,000.

Polymeric polycarboxyate builders are set forth in U.S. Pat. No. 3,308,067, Diehl, issued Mar. 7, 1967. Such materials include the water-soluble salts of homo- and copolymers of aliphatic carboxylic acids such as maleic acid, itaconic acid, mesaconic acid, fumaric acid, aconitic acid, citraconic acid and methylenemalonic acid.

Optionals

Other ingredients commonly used in detergent compositions can be included in the compositions of the present invention. These include flow aids, color speckles, bleaching agents and bleach activators, suds boosters or suds suppressors, antitarnish and anticorrosion agents, soil suspending agents, soil release agents, dyes, fillers, optical brighteners, germicides, pH adjusting agents, nonbuilder alkalinity sources, hydrotropes, enzymes, enzyme-stabilizing agents, chelating agents and perfumes.

The detergent granules of the present invention are particularly useful in a pouched through-the-wash product. Materials like sodium perborate tetrahydrate and monohydrate can be included as part of the granular detergent compositions of this invention. Pouched through-the-wash products are disclosed in the art, e.g., those disclosed in commonly assigned U.S. Pat. No. 4,740,326, Hortel et al., issued Apr. 26, 1988. Another useful pouch has at least one of its walls constructed of a finely apertured polymeric film. The terms "LAS" and "AS" as used herein mean, respectively, "sodium lauryl benzene sulfonate" and "alkyl sulfate." "MES" means sodium methyl ester sulphonate. The terms like "$C_{45}$" mean $C_{14}$ and $C_{15}$ alkyl, unless otherwise specified. TAS means Tallow alkyl sulphate.

The invention will be better understood in view of the following nonlimiting examples. The percentages are on a before drying weight basis, unless otherwise specified. The tables are followed with additional processing disclosure.

EXAMPLE 1

This Example describes the process in batch mode in a pilot plant scale high shear mixer, an Eirich RV02. The mixer is filled first with a mixture of the powders to be used, in this particular case a 2:1 ratio of Zeolite A to finely divided carbonate or Zeolite A to finely divided citrate. The surfactant is an aqueous paste of $C_{45}$AS with a detergent activity of 78% and a water content of 13%. In this Example, a 50% solution of NaOH (0.6 kg), is added to the paste (3 kg) in the mixer (the Eirich RV 02) before starting the granulation. Upon mixing, the paste solidifies and is ground by the mixer at 2500 rpm. The process is stopped and the powders (1.050 kg) are added. The mixer is operated until granulation takes place. The process is then stopped and the agglomerates are dried in a fluid bed and classified through mesh sieves. The agglomerates made have a detergent activity of 60% and a density of 600 g/L. They show excellent physical properties.

EXAMPLE 2

This Example is similar to Example 1. The powder mixture again a 2:1 ratio of Zeolite A to finely divided carbonate. The surfactant is an aqueous paste of $C_{45}$AS with a detergent activity of 78% and a water content of 13%. In this Example, both the powders (1.05 kg) and the paste (3 kg) are added to the mixer (the Eirich RV02) before starting the granulation. A certain amount (2 kg) of dry ice is also added to the mixer to lower the temperature below −15° C. The mixer is then started at a speed of 1600 (2500) rpm. At first, at the low temperature achieved, the mixture is in the form of a fine powder. The mixer is operated until the temperature raises to the point (12° C.) where granulation occurs. The process is then stopped and the agglomerates are dried in a fluid bed and classified through mesh sieves. The agglomerates made have a detergent activity of 60% and a density of 625 g/L. They show excellent physical properties.

EXAMPLE 3

This Example describes the process in batch mode in a lab scale high shear mixer (food processor). The mixer is filled first with a mixture of the powders to be used, in this particular case a 2:1 ratio of Zeolite A to finely divided sodium carbonate. The surfactant is an aqueous paste of C45 AS with detergent activity of 72% and a water content of 24%. In this Example, silica powder (40 g), is added to the paste (400 g) in the mixer prior to starting granulation. Upon mixing, the paste stiffens. The process is stopped and the powders (105 g) are added to the paste (335 g). The mixer is operated until granulation takes place. The process is then stopped and the agglomerates are dried in a fluid bed and classified through mesh sieves. The agglomerates made have a detergent activity of 55-60% and a density of 650 g/L. they show excellent physical properties.

EXAMPLE 4

This example describes the process of paste conditioning in continuous mode in a pilot plant twin screw extruder, Werner and Pfleiderer C58 with a barrel in six sections, followed by immediate granulation of the paste exiting the extruder in a lab scale high shear mixer. The surfactant is an aqueous paste of sodium linear alkyl benzene sulphonate (NaLAS) with a detergent activity of 78% and a water content of 18%. The paste is introduced into the extruder at a temperature of 70° C. and at a flow rate of 150 kg/hr. The paste exiting the extruder is agglomerated in the lab scale high shear mixer with a ratio of 2:1 by weight of zeolite A to finely divided carbonate powders. The paste is added to the bed of powders until agglomerates of average particle size between 400 and 800 μm are obtained. The agglomerates are then dried in a fluid bed and analysed for LAS content (described herein as activity).

The paste is simply pumped through the extruder which is operated between 100 and 120 rpm. The paste exiting the extruder is still at 70° C. and the activity of the resulting agglomerates is 32%.

EXAMPLE 5

Agglomerates are made using the same equipment and weight ratios as described in example 4. In this example the paste is cooled while being pumped through the extruder by means of cooling coils containing city water at 15° C. in the first two sections of the barrel and chilled glycol at −20° C. in the last four sections of the barrel. The exit temperature of the paste at steady state conditions is 30° C. and the activity of the resulting agglomerates is 45%.

EXAMPLE 6

Agglomerates are made using the same equipment and weight ratios as described in example 4. In this example, a solid powder of a copolymer of maleic and acrylic acids is added to the paste at the inlet of the extruder. Without any cooling, the paste temperature exiting the extruder is 68° C. and the activity of the resulting agglomerates is 38%. When cooling is applied to the extruder barrel, in the same way as described in example 5, the paste exit temperature is 30° C. and the activity of the resulting agglomerates is 54%.

EXAMPLE 7

Agglomerates are made using the same equipment and weight ratios as described in example 4. However in this example the NaLAS is replaced by a surfactant paste containing 60% by weight of sodium alkyl sulphate with a carbon chain length of C14–C15 and containing 25% water. The inlet temperature is again 70° C.

The paste is simply pumped through the extruder and exits at a temperature of 70° C. The activity of the resulting agglomerates is 36%.

EXAMPLE 8

Agglomerates are made using the same equipment and weight ratios as described in example 7, also using the alkyl sulphate paste of that example. However in this example, a vacuum is applied through a vacuum port in one of the barrels by using a vacuum capable of delivering 70 mbar of vacuum. At the same time cooling is applied through the internal coils in the extruder with the use of glycol at −20° C. in all sections of the barrel. The paste exiting the extruder has an activity of 72° C. and a water content of 22% and a temperature of 25° C. The agglomerates made with this paste have an alkyl sulphate activity of 60%.

EXAMPLE 9

Agglomerates are made using the same equipment and weight ratios as described in example 7, also using the alkyl sulphate paste of that example. In this example the paste was cooled by passing glycol at −20° C. through the cooling coils and additionally by injecting liquid nitrogen into the fourth section of the barrel at a rate of 15 kg/hr. The paste coming out of the extruder had a temperature of 15° C. and the resulting agglomerates had an alkyl sulphate activity of 65%.

We claim:

1. A process for making a concentrated granular detergent composition comprising the processing stages of:

(i) neutralising anionic surfactant acid or acids in an excess of alkali to form a high active (at least 40% by weight of anionic surfactant) paste, said paste having a viscosity of at least 1- Pa.s when measured at 70° C. and a shear rate of 25 $s^{-1}$;

(ii) maintaining said paste without further processing;

(iii) conditioning said paste by raising the apparent viscosity of said paste at said temperature and said shear rate; and (iv) forming high active detergent granules in a high shear mixer/granulator in the presence of an effective amount of detergent powder.

2. The process of claim 1 wherein said conditioning comprises steps(s) selected from the group consisting of pumping, reducing moisture, cooling, adding chemical structurants to said high active paste and combinations thereof, and wherein an extruder having a barrel and a mixing section is used during said conditioning step.

3. A process according to claim 2 wherein the paste enters the inlet port of the extruder at a temperature between 40° C. and 80° C. and under a vacuum of from 0 to 7.3 kPa (below atmosphere pressure).

4. A process according to either claim 2 or 3 wherein one or more entry ports in the extruder barrel allow the addition of powders and/or additional pastes which are then mixed in the extruder.

5. A process according to claim 2 wherein said barrel of said mixing section of said extruder is cooled by any suitable means including addition of up to 30% by weight to the paste of solid carbon dioxide or liquid nitrogen directly into said extruder barrel.

6. A process according to claim 2 wherein said extruder is a twin screw extruder.

7. A process according to claim 2 wherein, said chemical structurant is in a powdered form.

* * * * *